United States Patent [19]

Kimura et al.

[11] 4,164,370
[45] Aug. 14, 1979

[54] SHUTTER DEVICE IN A CAMERA

[75] Inventors: Shuji Kimura, Yokohama; Shigeo Akasaka, Kodaira; Koichi Daitoku, Tokyo; Hiroshi Hasegawa, Tokyo; Makoto Kimura, Tokyo, all of Japan

[73] Assignee: Nippon Kogaku K.K., Tokyo, Japan

[21] Appl. No.: 843,317

[22] Filed: Oct. 18, 1977

[30] Foreign Application Priority Data

Oct. 21, 1976 [JP] Japan .................... 51-140167[U]
Oct. 29, 1976 [JP] Japan .................... 51-129365
Nov. 16, 1976 [JP] Japan .................... 51-157760[U]

[51] Int. Cl.² ...................... G03B 9/28; G03B 9/58
[52] U.S. Cl. ................................ 354/243; 354/173; 354/234; 354/241
[58] Field of Search ............... 354/241, 242, 243, 244, 354/234, 173

[56] References Cited

U.S. PATENT DOCUMENTS

3,713,373  1/1973  Sato .............................. 354/242 X
3,913,117  10/1975  Endo et al. ......................... 354/242

Primary Examiner—Michael L. Gellner
Attorney, Agent, or Firm—Fitzpatrick, Cella, Harper & Scinto

[57] ABSTRACT

A shutter device in a camera which effects photography with shutter curtains maintained open for a predetermined time comprises a rotatable member for normal rotation by a spring, shutter opening formation means operatively associated with the rotatable member to move in a direction to form a shutter opening with normal rotation of the rotatable member and to move in a direction to close the shutter opening with reverse rotation of the rotatable member, a motor, control means operatively associated with the motor to be displaceable to a first position in which it blocks normal rotation of the rotatable member and maintains the shutter opening closed, a second position in which it permits the normal rotation of the rotatable member by the bias force of the spring immediately after the motor is started, and a third position in which it transmits the drive of the motor to the rotatable member so as to reverse the rotation of the rotatable member after the normal rotation thereof, means for stopping normal rotation of the rotatable member, and motor control means for starting the motor in response to an extraneous operating signal for starting photography, for stopping the motor after the normal rotation of the rotatable member by the bias force of the spring is started, for starting the motor in response to an extraneous signal for terminating the photography, and for stopping the motor when the shutter opening has reached its closed position.

5 Claims, 9 Drawing Figures

FIG. 1
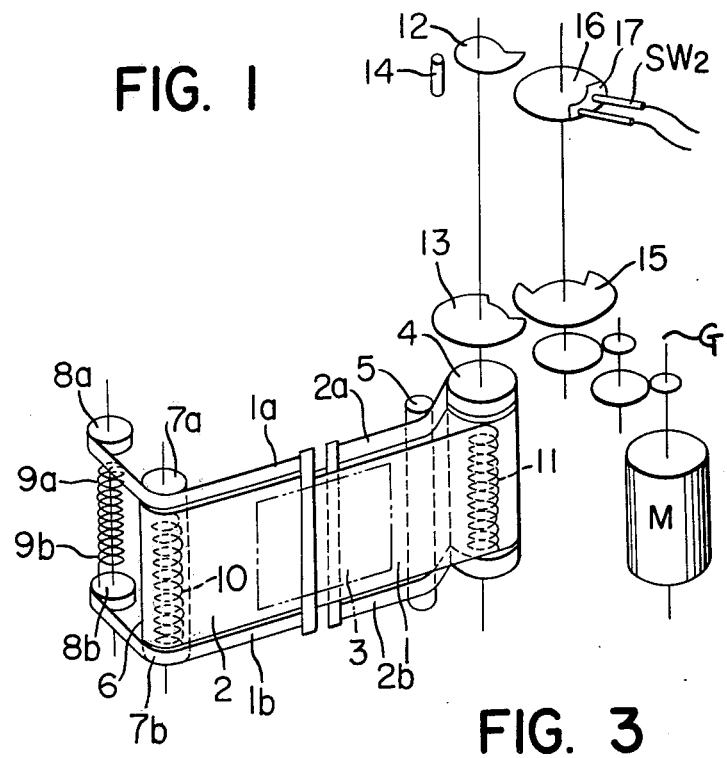
FIG. 2
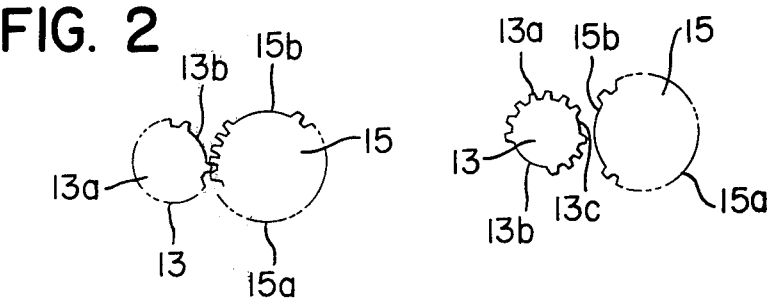
FIG. 3
FIG. 4
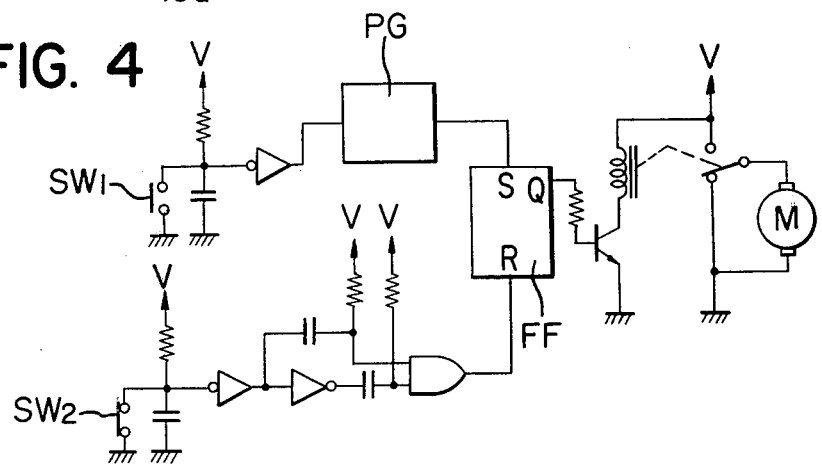

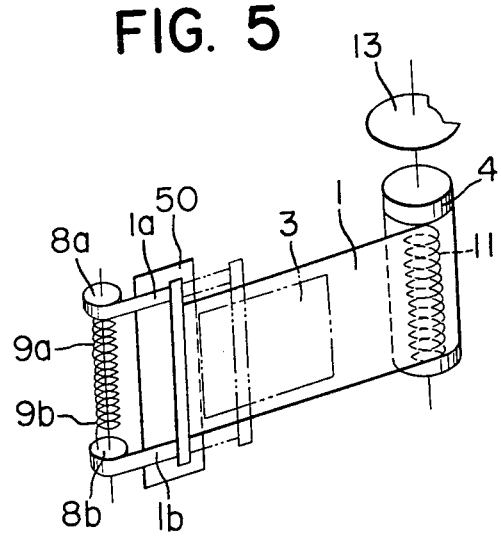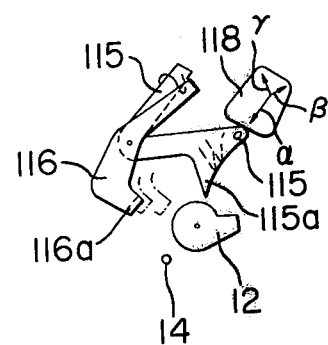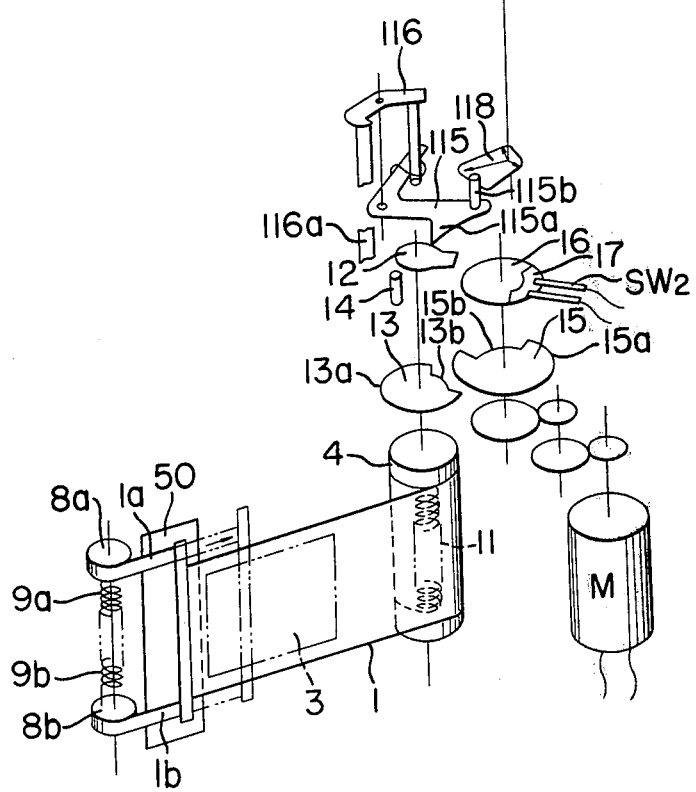

SHUTTER DEVICE IN A CAMERA

BACKGROUND OF THE INVENTION

1. Field of the Invention

This invention relates to a focal plane shutter device in a camera which device effects photography with the shutter curtains maintained open for a predetermined time.

2. Description of the Prior Art

There are known camera shutter devices of the class described in which the front shutter curtain is moved to open the shutter for exposure control, and then the rear shutter curtain is moved to close the shutter. These devices, however, have required mechanisms for driving the front and the rear curtains discretely and this has led to complexity and bulkiness of the shutter device.

Therefore, in a camera which effects photography with the shutter curtains maintained open for a predetermined time, for example, a camera in which film is continuously transported with the shutter curtains maintained open while a flash tube flashes to cause the continuous motion of an object to be decomposed and recorded on the film (hereinafter referred to as multi-photographic camera), if the above-described conventional shutter device were employed, the moving time of the shutter curtains would offer no problem but the shutter device would become complex and bulky.

SUMMARY OF THE INVENTION

We have conceived and contribute by the present invention a shutter device which is simple and compact and which is useful in a camera which effects photography with the shutter curtains maintained open for a predetermined time.

In the above-described conventional multiphotographic camera, there are only two shutter curtain positions, namely, fully open and fully closed, and the size of the picture-taking field during the fully open position has been restricted by the size of the aperture. Accordingly, if photography is effected in such a manner that no overlap occurs between picture-taking fields, the number of frames available on the film is determined naturally.

According to a second aspect of the present invention we provide a camera shutter device in which the size of the shutter opening is adjustable in accordance with the photographing conditions, that is, the number of frames available on a predetermined length of film is variable.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

FIG. 1 is an exploded perspective view of a first embodiment of the present invention;

FIGS. 2 and 3 are plan views showing different positions of cut-away gears employed in the first embodiment of the present invention;

FIG. 4 is a diagram of the motor control circuit in the first embodiment of the present invention;

FIG. 5 is a schematic perspective view showing a portion of the second embodiment of the present invention;

FIG. 6 is an exploded perspective view of a third embodiment of the present invention;

FIG. 7 is a plan view of the mechanism for adjusting the shutter opening in the third embodiment of the present invention;

DESCRIPTION OF THE PREFERRED EMBODIMENTS

Figure 8:
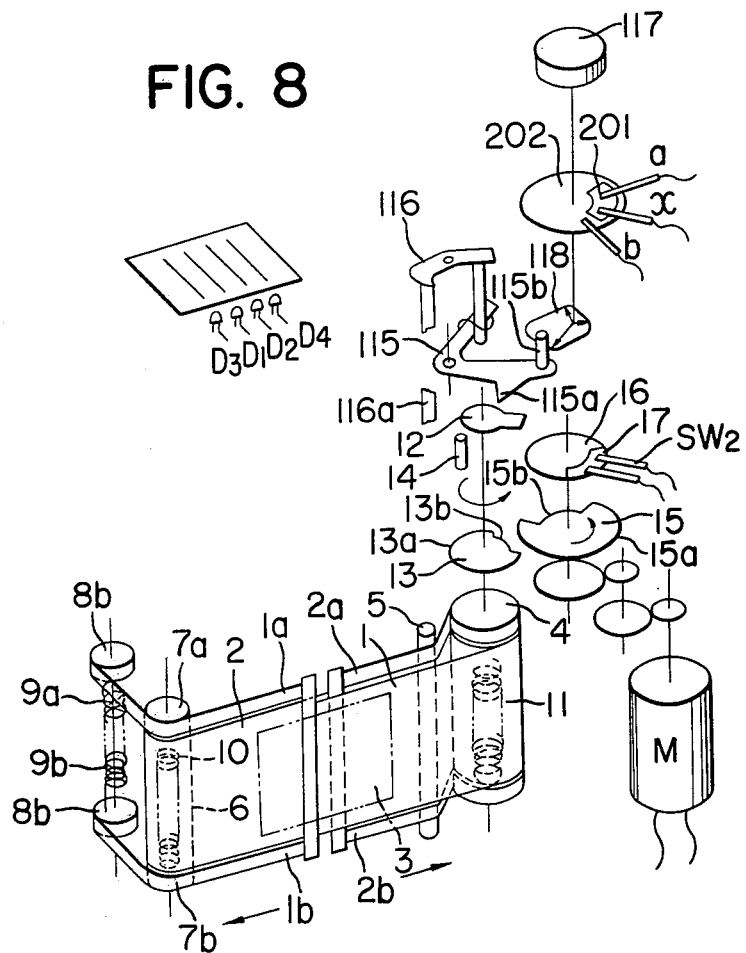
FIG. 8 is an exploded perspective view of a fourth embodiment of the present invention.

Referring to FIGS. 1 to 4, and particularly to FIG. 1, a first and a second shutter curtain 1 and 2, respectively comprise curtain portions and two strings 1a, 1b and 2a, 2b. A large drum 4 and roller 5 are rotatably journalled at one side of a picture-taking light entrance area 3 whose size is restricted by an aperture (not shown) or the like, and a small drum 6, guide pulleys 7a, 7b and take-up pulleys 8a, 8b are rotatably journalled at the other side. The guide pulleys 7a, 7b are mounted on the same rotary axis as the small drum 6, but are rotatable independently of the latter.

The curtain portion of the first shutter curtain 1 is wound counter-clockwise on the large drum 4 as viewed from above, with the strings 1a and 1b thereof passing over the guide pulleys 7a and 7b, respectively, and being wound on the take-up pulleys 8a and 8b, respectively. Springs 9a and 9b bias the take-up pulleys 8a and 8b in a clockwise direction, as viewed from above.

The strings 2a and 2b of the second shutter curtain 2 are passed over the roller 5 and are wound in a clockwise direction on the large drum 4, and the curtain portion of the second shutter curtain 2 is wound on the small drum 6. A spring 10 biases the small drum 6 in a clockwise direction. This spring 10 has a biasing force substantially equal to that of the aforementioned springs 9a, 9b. Thus, counter-clockwise rotation of the large drum 4, under the influence of spring 11 moves the shutter curtains 1 and 2 to form an opening therebetween, and clockwise rotation of the large drum 4 moves the shutter curtains 1 and 2 to close the opening.

A rotatable pawl 12 and a first cut-away gear 13 are mounted on the rotary shaft of the large drum 4 for rotation therewith, and counter-clockwise rotation of this rotatable pawl 12 is limited by a stop pin 14. A second cut-away gear 15 meshes with the first cut-away gear 13 and is driven from drive means such as motor M and a gear train G or the like. The first and second cut-away gears 13 and 15, as shown in FIGS. 2 and 3, respectively have gear portions 13a, 15a and cut-away portion 13b, 15b. The gear portion 13a of the first cut-away gear 13 has a cut-away portion 13c (FIG. 3) lacking one gear tooth, so that it can readily mesh with the gear portion 15a of the second cut-away gear 15 when the portion to be opposed to it changes from the cut-away portion 15b to the gear portion 15a with rotation of the second cut-away gear 15. These two cut-away gears 13 and 15 together constitute control means for rotating the large drum 4 in normal and reverse directions by one-way rotation of the motor M which is controlled by an electrical circuit as shown in FIG. 4. In this Fig., a start switch SW1 is closed during the forward and the backward movement stroke of a shutter button (not shown), and when so closed, the switch supplies a pulse signal through a single-pulse generating circuit PG to the S terminal of a flip-flop circuit FF to drive the motor M. A phase detecting switch SW2 is ON-OFF-controlled by a metal plate 17 (FIG. 1) provided on a switch plate 16 rotatable with the second cut-away gear 15. The switch plate 16 detects the opening of the shutter curtains 1 and 2 when the metal plate 17 is moved from its position of FIG. 1 to open the phase detecting switch SW2, and detects the closing of the shutter curtains 1 and 2 when the metal plate 17 is in its position of FIG. 1 to close the phase detecting switch SW2. This phase detecting switch SW2 supplies a pulse signal, generated upon change of the position of the shutter curtains 1 and 2, to the terminal R of the flip-flop circuit FF to stop the motor M.

Operation will now be described. When a shutter button (not shown) is depressed while the parts are in the position of FIGS. 1, 2 and 4, the start switch SW1 shown in FIG. 4 is closed to cause the single-pulse generating circuit PG to generate a single pulse which is applied to the flip-flop circuit FF. Thus, the motor M is electrically energized to start running. As a result, the second cut-away gear 15 shown in FIGS. 1 and 2 is rotated counter-clockwise. Since, however, the gear portion 15a of the second cut-away gear 15 is then opposed to the cut-away portion 13b of the first cut-away gear 13, the first cut-away gear 13 is not operated. As the rotation of the second cut-away gear 15 progresses until the cut-away portion 15b of the second gear 15 becomes opposed to the first cut-away gear 13, the first cut-away gear 13, the large drum 4 and the rotatable pawl 12 are rotated counter-clockwise by the bias force of the spring 11. Thereafter, the metal plate 17 opens the phase detecting switch SW2 upon rotation of the switch plate 16, whereupon a pulse is applied to the terminal R of the flip-flop circuit FF, shown in FIG. 4, to stop the motor M. By the counter-clockwise rotation of the aforementioned drum 4, the first and second shutter curtains 1 and 2 are moved to form an opening through which picture-taking light is directed to the surface of film. On the other hand, the rotatable pawl 12 continues to rotate until it is stopped by the stop pin 14 and therefore, the first cut-away gear 13 is stopped at a position shown in FIG. 3 and the shutter curtains 1 and 2 become fully open, whereby a picture-taking field equal in size to the picture-taking light entrance area 3 restricted by the aperture (not shown) is formed on the film (not shown). Thereafter, the shutter curtains 1 and 2 maintain this position and the film is transported at a predetermined speed by other means (not shown) while, at the same time, a speed light (strobo) flashes so that continuous motion of an object being photographed is decomposed and recorded on the film.

When a shutter button (not shown) is released, the start switch SW1 in FIG. 4 is again closed to apply a single pulse to the terminal S of the flip-flop circuit FF. On the other hand, the metal plate 17 holds the phase detecting switch SW2 in its open position so that no pulse is applied to the terminal R of the flip-flop circuit FF. Accordingly, the motor M starts running. Thus, the second cut-away gear 15 and the switch plate 16 are again rotated counter-clockwise. Since, however, the first cut-away gear 13 and the second cut-away gear 15 are in the positions of FIG. 3, the first cut-away gear 13 does not immediately operate. As the rotation of the second cut-away gear 15 progresses until the gear portion 15a comes into the portion 13c of the first cut-away gear 13 lacking one tooth, the second cut-away gear 15 comes into mesh engagement with the first cut-away gear 13, so that the first cut-away gear 13 is rotated clockwise by the motor M. The rotation of the cut-away gear 13 also causes clockwise rotation of the rotatable pawl 12 and the large drum 4. Thus, the shutter curtains 1 and 2 move to close the opening therebetween. When the cut-away portion 13b of the first cut-away gear 13 becomes opposed to the gear portion 15a of the second cut-away gear 15, as shown in FIG. 2, the first cut-away gear 13 is no longer driven by the counter-clockwise rotation of the second cut-away gear 15. Moreover, since the cut-away portion 13b of the first cut-away gear 13 is opposed to the gear portion 15a of the second cut-away gear 15 and the teeth of the first cut-away gear 13 is restrained from rotation by the teeth of the second cut-away gear 15 rotating counter-clockwise, the cut-away gear 13 and the large drum 4 are not rotated counter-clockwise by the force of the spring 11. Accordingly, the first cut-away gear 13 is stopped at its position shown in FIG. 2. As the rotation of the second cut-away gear 15 progresses until the metal plate 17 on the switch plate 16 closes the phase detecting switch SW2, a pulse is applied to the terminal R of the flip-flop circuit FF to stop the motor M. Such position, in which the shutter curtains 1 and 2 have been charged up, is the position shown in FIG. 2.

Description has hitherto been made of the case in which the cut-away gear 13 is provided on the rotary shaft of the large drum 4. Alternatively, however, a spur gear (not shown) may be provided in place of the cut-away gear 13 and brought into mesh engagement with the second cut-away gear 15. In such an instance, if the shutter button is depressed to rotate the cut-away gear 15 counter-clockwise from the position of FIG. 2 in order to open the shutter curtains, the spur gear will be rotated clockwise and the shutter curtains 1 and 2 will move forward from their positions shown in FIG. 1. When the cut-away portion 15b of the cut-away gear 15 becomes opposed to the spur gear, this latter gear will be rotated counter-clockwise to move the shutter curtains 1 and 2 to open them and stop the motor M before the gear portion 15a of the cut-away gear 15 meshes with the spur gear. Thereafter, photography may take place and the shutter button may be released and when the cut-away gear 15 is again rotated counter-clockwise, the cut-away gear 15 will mesh with the spur gear to rotate the latter clockwise and move the shutter curtains 1 and 2 to close them. Of course, the cut-away gear 15 continues to rotate until it is stopped upon deenergization of the motor M. Thus, even after being closed, the shutter curtains 1 and 2 continue to move. In the above-described embodiment which employs two cut-away gears, it never occurs that the first cut-away gear 13 is rotated clockwise by the operation of the second cut-away gear 15 before the shutter curtain is opened, nor does it occur, once the cut-away portion 13b of the first cut-away gear 13 has become opposed to the gear portion 15a of the second cut-away gear 15 during the closing of the shutter curtains, that the first cut-away gear 13 is rotated clockwise by the counter-clockwise rotation of the second cut-away gear 15 taking place thereafter. However, while the alternative embodiment which employs the spur gear does involve excess operations before the shutters are opened and after the shutters are closed, nevertheless, this alternative embodiment is sufficient to achieve the desired result of the present invention.

Reference will now be had to FIG. 5 to describe a second embodiment of the present invention. In the above-described embodiment, two shutter curtains are moved to form an opening therebetween, but as shown in FIG. 5, the first shutter curtain 1 alone may be employed as the shutter curtain and this shutter curtain 1 may be moved in a direction to form an opening between the shutter curtain and a light shielding member 50 secured to the camera body. The other points of construction and operation of this embodiment are similar to those in the previously described embodiment and need not be described further.

Reference will now be had to FIGS. 6 and 7 to describe a third embodiment relative to the second aspect of the present invention. Throughout the drawings, similar reference characters designate similar members.

Near the rotatable pawl 12, a stop pin 14 is securely disposed for engagement therewith. Also near the rotatable pawl 12, a first lever 115 and a second lever 116 are mounted for pivotal movement on a common shaft. The first lever 115 has a restraining portion 115a engageable with the rotatable pawl 12 and a pin 115b. The second lever 116 has a restraining portion 116a engageable with the rotatable pawl 12 and is rotatable with the first lever 115. The elements 115 and 116 together constitute a restraining member, which in turn constitute shutter curtain stop means with the aforementioned shutter curtain interlocking member 12. A rotatable cam 118 operatively associated with an operating knob 117 has three distinctly radiused portions $\alpha$, $\beta$ and $\gamma$, the operation of which actuates the pin 115b to select, from among the elements 14, 115 and 116, a member for restraining the rotation of the rotatable pawl 12.

Operation of the present embodiment will now be explained. When a shutter button (not shown) is depressed with the parts in the position of FIGS. 2, 4, 6 and 7 prior to shutter release, the start switch SW1 shown in FIG. 4 is closed to cause the single-pulse generating circuit PG to generate a single pulse which is applied to the terminal S of the flip-flop circuit FF. Thus, the motor M is electrically energized to start running. As a result, the second cut-away gear 15 in FIGS. 2 and 6 is also rotated counter-clockwise. Since, however, the gear portion 15a of the second cut-away gear 15 is then opposed to the cut-away portion 13b of the first cut-away gear 13, the second cut-away gear 15 does not operate the first cut-away gear 13. As the rotation of the second cut-away gear 15 progresses until the cut-away portion 15b thereof becomes opposed to the first cut-away gear 13, the bias force of the spring 11 rapidly rotates the first cut-away gear 13, the large drum 4 and the rotatable pawl 12 counter-clockwise. Thereafter, when the phase detecting switch SW2 is opened with rotation of the switch plate 16, a pulse is applied to the terminal R of the flip-flop circuit FF shown in FIG. 4, thus stopping the motor M. Also, with the aforementioned rotation of the large drum 4, the shutter curtain 1 is moved rightwardly, as viewed, to form an opening between itself and a light shielding member 50 through which picture-taking light may be directed to a surface of a film. On the other hand, the rotation of the rotatable pawl 12 is limited by a portion 115a of the lever 115, and the first cut-away gear 13 is stopped at the position of FIG. 3 while the shutter curtain 1 is also stopped midway of the picture-taking light entrance area 3 as indicated by the dot-and-dash line in FIG. 6. Therefore, after that, the shutter curtain 1 maintains this position and the film is continuously transported at a constant speed by other means (not shown) while, at the same time, a strobo flashes so that continuous motion of an object being photographed is decomposed and recorded on the film.

Next, when the shutter button (not shown) is released, the start switch SW1 shown in FIG. 4 is again closed to rotate the motor M. Accordingly, the second cut-away gear 15 and the switch plate 16 are also again rotated counter-clockwise. Since, however, the first cut-away gear 13 is in its position of FIG. 3, it does not immediately operate. As the rotation of the second cut-away gear 15 progresses until the gear portion 15a thereof comes opposite the portion 13c of the first cut-away gear 13 which lacks one tooth, the second cut-away gear 15 meshes with the first cut-away gear 13 so that this gear 13 is also rotated clockwise by the motor M. With the rotation of this cut-away gear 13, the rotatable pawl 12 and the large drum 4 are also rotated clockwise. Thus, the shutter curtain 1 is moved leftwardly, as viewed, and the shutter is closed, and when, as shown in FIG. 2, the cut-away portion 13b of the first cut-away gear 13 becomes opposed to the gear portion 15a of the second cut-away gear 15, the first cut-away gear 13 alone stops rotating. Moreover, since the cut-away portion 13b of the first cut-away gear 13 is then opposed to the gear portion 15a of the second cut-away gear 15 and is restrained from rotation by the second cut-away gear 15, the large drum 4 is not rotated by the force of the spring 11. As the rotation of the second cut-away gear 15 progresses until the phase detecting switch SW2 is closed by the metal plate 17 on the switch plate 16, a signal is applied to the terminal R of the flip-flop circuit FF to stop the motor M. This position in which the shutter curtain 1 has been charged up is the position shown in FIG. 2.

Description has hitherto been made of the case in which the first and second pivotable levers 115 and 116 are in their positions indicated by solid lines in FIGS. 6 and 7, namely, where the pin 115b of the first lever 115 is supported by the large-radiused portion $\alpha$ of the rotatable cam 118. Description will now be made of the case wherein the operating knob 117 is turned clockwise to cause the small-radiused portion $\beta$ of the rotatable cam 118 to support the pin 115b of the first lever 115. When the small-radiused portion $\beta$ of the rotatable cam 118 becomes opposed to the pin 115b with the operation of the operating knob 117, the first lever 115 is rotated counter-clockwise so that the first restraining portion 115a is retracted to the remotest position from the rotatable pawl 12 which is outside the orbit of the pawl 12, namely, the position indicated by the dots-and-dash line in FIG. 7. At the same time, the second pivotable lever 116 is rotated counter-clockwise so that the restraining portion 116a advances into the orbit of the rotatable pawl 12, namely, to the position indicated by the dots-and-dash line in FIG. 7. Thus, as the second cut-away gear 15 is rotated counter-clockwise in pursuance of the above-described process so that the second cut-away portion 15b thereof becomes opposed to the first cut-away gear 13, the large drum 4 and the rotatable pawl 12 together with the first cut-away gear 13 are rotated counter-clockwise until the rotatable pawl 12 is stopped by the restraining portion 116a of the lever 116. At this time, the shutter curtain 1 is stopped midway of the picture-taking light entrance area 3, as already described, but since the stroke of the rotatable pawl 12 until restrained by the lever 116 is longer than the stroke of the pawl 12 until restrained by the lever 115, the large drum 4 is rotated correspondingly more, thus forming an opening between the shutter curtain and the light shielding member 50 which is even greater than that indicated by dot-and-dash line in FIG. 6. Also, the restrained position of the rotatable pawl 12 is variable so that not the first cut-away portion 13c but the second cut-away portion (not shown) of the first cut-away gear 13 becomes opposed to the second cut-away gear 15. The other points of operations are similar to what have already been described, and need not be explained further.

Description will now be made of the case wherein the operating knob 117 is further rotated clockwise to cause the medium-radiused portion γ of the rotatable cam 118 to support the pin 115b of the first pivotable lever 115. When the medium-radiused portion γ of the rotatable cam 118 becomes opposed to the pin 115b with the operation of the operating knob 117, the first pivotable lever 115 is rotated clockwise so that the first restraining portion 115a thereof advances from the position indicated by dots-and-dash line in FIG. 7 to the position indicated by dot-and-dash line. However, the first restraining portion 115a never advances into the orbit of the rotatable pawl 12. At the same time, the second pivotable lever 116 is rotated clockwise so that the second restraining portion 116a is retracted from the position indicated by dots-and-dash line in FIG. 7 to the position indicated by dot-and-dash line, namely, outwardly of the orbit of the rotatable pawl 12. Therefore, as the second cut-away gear 15 is rotated counter-clockwise from the position of FIG. 2 in pursuance of a similar process so that the second cut-away portion 15b of the second cut-away gear 15 becomes opposed to the first cut-away gear 13, the first cut-away gear 13 and the large drum 4 are rotated until the rotatable pawl 12 is stopped by the stop pin 14. Since the rotatable pawl 12 is not stopped by the restraining portions 115a and 116a of the levers 115 and 116, respectively, the shutter curtain 1 is never stopped in the picture-taking light entrance area 3. Thus, the shutter curtain 1 forms the greatest opening between itself and the light shielding member 50. Also, since the rotatable pawl 12 is stopped by the stop pin 14, not the first cut-away portion 13c or the second cut-away portion, but the third cut-away portion (not shown) of the first cut-away gear 13 becomes opposed to the second cut-away gear 15. The other points of operation are similar to what have already been described and need not be described further.

Figure 9:
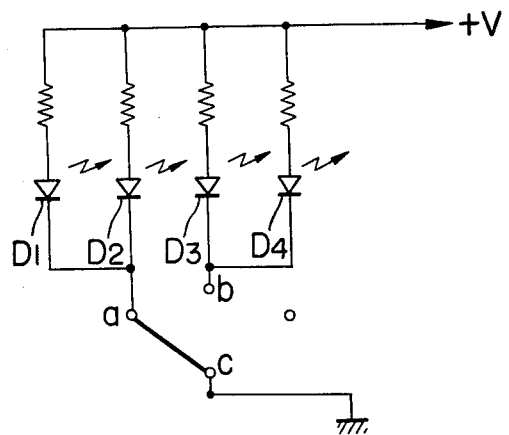
FIG. 9 is a diagram of the circuit for displaying the extent of the shutter opening in the fourth embodiment.

Description will now be made of the fourth embodiment of the present invention which has means for displaying the extent of the opening in the shutter curtain 1 set by the operating knob 117. In FIG. 8, a rotatable disc 202 having a metal plate 201 is provided on the same shaft as an operating knob 117 and a rotatable cam 118, and is rotatable with the knob and cam. Three terminals a, b and x are provided in such a manner that their tip ends are in contact with the upper surface of the rotatable disc 202. As shown in FIG. 9, light-emitting elements $D_1$ and $D_2$ such as LEDs or the like are provided in parallel and connected to the terminal a, and further light-emitting elements $D_3$ and $D_4$ provided in parallel are connected to the terminal b. The light-emitting elements $D_1$–$D_4$ described above are arranged as within a viewfinder in the manner as shown in FIG. 8.

Thus, in the position of FIG. 8 wherein the first pivotable lever 115 blocks the rotatable pawl 12, the terminals a–x are connected together by the metal plate 201 and the light-emitting elements $D_1$ and $D_2$ are turned on while the shutter curtain 1 is not very much opened with a minimum size of picture-taking field indicated by the light-emitting elements $D_1$ and $D_2$, and this is displayed as in the viewfinder field.

In a position wherein a second pivotable lever 116 blocks the rotatable pawl 12 with clockwise rotation of an operating knob 117, the terminals b–x are connected together by rotation of the metal plate 201 and the light-emitting elements $D_3$ and $D_4$ are turned on while the shutter curtain is opened a little more slightly to increase the size of the picture-taking field, and this is displayed in the viewfinder field.

When the operating knob 117 is further turned clockwise to bring about a position in which the stop pin 14 blocks the rotatable pawl 12, the terminals a–x and b–x are not connected together by the metal plate 201, that is, the open terminal and the terminal x are connected so that neither of the light-emitting diodes $D_1$–$D_4$ are turned on. This displays that the shutter curtain 1 is not within the picture-taking light entrance area 3 and that the picture-taking field has become maximum. The variations in size of the opening of the shutter curtain to adjust the size of the picture-taking field as already described lead to different angles of rotation of the large drum and the first cut-away gear rotated in normal direction to open the shutter. This in turn leads to different angles of rotation required for the cut-away portion of the first cut-away gear to become opposed to the second cut-away gear after the large drum and the first cut-away gear are reversed in rotation to close the shutter. The first cut-away gear is provided to break its engagement with the second cut-away gear when the cut-away portion of the first cut-away gear has become opposed to the second cut-away gear, namely, when the shutter curtain has been closed irrespective of the extent of the opening. In a device wherein the extent of the opening of the shutter is not variable, the first cut-away gear need not always be employed but it may be replaced by a simple gear.

We believe that the construction and operation of our novel shutter device will now be understood and that the advantages thereof will be fully appreciated by those persons skilled in the art.

We claim:

1. A shutter device in a camera which effects photography with shutter curtains maintained open for a predetermined time, comprising:

a rotatable member; spring means biasing said rotatable member for normal rotation;

shutter opening formation means operatively associated with said rotatable member to move in a direction to form a shutter opening upon normal rotation of said rotatable member and to move in a direction to close the shutter opening upon reverse rotation of said rotatable member;

drive means;

control means operatively associated with said drive means for displacement to a first position to block normal rotation of said rotatable member and to maintain the shutter in closed position, a second position in which it permits the normal rotation of said rotatable member by the bias force of said spring immediately after said drive means becomes operative, and a third position for transmission of the drive of drive means to said rotatable member to reverse the rotation of said rotatable member after the normal rotation thereof;

means for stopping normal rotation of said rotatable member; and control means for starting said drive means in response to an extraneous operating signal for starting photography, for stopping said drive means after the normal rotation of said rotatable member by the bias force of said spring is started, for starting said drive means in response to an extraneous signal for terminating the photography, and for stopping said drive means when said shutter has reached its closed position.

2. A shutter device according to claim 1, wherein said shutter opening formation means comprises two shutter curtains each consisting of a curtain portion and two strings provided at an end of said curtain portion, the curtain portion of one of said shutter curtains and the string portion of the other shutter curtain being wound on said rotatable member in opposite directions, the curtain portion of the other shutter curtain being wound on a second rotatable member, and the string portion of said one shutter curtain being wound on a third rotatable member, whereby the curtain portions of said shutter curtains form the shutter opening.

3. A shutter device according to claim 1, wherein said shutter opening formation means comprises a shutter curtain consisting of a curtain portion and two strings provided at an end of said curtain portion, and a light-intercepting member secured to the body of the camera, said curtain portion being wound on said rotatable member, and said string portion being wound on a second rotatable member, whereby said curtain portion and said light-intercepting member together form the shutter opening.

4. A shutter device according to claim 1, wherein said control means comprises a first cut-away gear rotatable with said rotatable member and a second cut-away gear engageable with said first cut-away gear and rotatable in one direction by said drive means, said second cut-away gear when in said first position engages said first cut-away gear, said second gear when in said second position has its cut-away portion in opposed relationship with said first cut-away gear thereby to permit normal rotation of said rotatable member, and second cut-away gear when in said third position meshes with said cut-away gear.

5. A shutter device according to claim 1, including extraneously operable means for adjusting the stop position of said stop means thereby to stop normal rotation of said rotatable member at different positions, whereby the size of the shutter opening is adjustable.

* * * * *

UNITED STATES PATENT AND TRADEMARK OFFICE
CERTIFICATE OF CORRECTION

PATENT NO. : 4,164,370
DATED : August 14, 1979
INVENTOR(S) : SHJI KIMURA, ET AL

It is certified that error appears in the above-identified patent and that said Letters Patent are hereby corrected as shown below:

On Title Page, under heading "Foreign Application Priority Data" Section [30]:

"51-140167[U]" should read --51-140617[U]--;

"51-157760[U]" should read --51-152760[U]--.

Signed and Sealed this

Eleventh Day of December 1979

[SEAL]

Attest:

SIDNEY A. DIAMOND

Attesting Officer

Commissioner of Patents and Trademarks